(12) United States Patent
VandenBrekel

(10) Patent No.: US 11,962,710 B2
(45) Date of Patent: Apr. 16, 2024

(54) SYSTEMS AND METHODS FOR GENERATION OF ENERGY-BACKED DIGITAL UNITS STORED IN A DECENTRALIZED LEDGER

(71) Applicant: Farad Technologies Group, LLC, Orlando, FL (US)

(72) Inventor: Nicholas VandenBrekel, Orlando, FL (US)

(73) Assignee: FARAD TECHNOLOGIES GROUP, LLC, Orlando, FL (US)

( * ) Notice: Subject to any disclaimer, the term of this patent is extended or adjusted under 35 U.S.C. 154(b) by 0 days.

(21) Appl. No.: 17/871,588

(22) Filed: Jul. 22, 2022

(65) Prior Publication Data

US 2024/0020707 A1    Jan. 18, 2024

Related U.S. Application Data

(63) Continuation of application No. 17/863,165, filed on Jul. 12, 2022.

(51) Int. Cl.
*G06Q 30/018* (2023.01)
*G06Q 40/04* (2012.01)
(Continued)

(52) U.S. Cl.
CPC ............ *H04L 9/50* (2022.05); *G06Q 30/018* (2013.01); *G06Q 40/04* (2013.01); *H04L 9/3247* (2013.01);
(Continued)

(58) Field of Classification Search
CPC ....... G06Q 30/018; G06Q 30/04; G06Q 50/06
See application file for complete search history.

(56) References Cited

U.S. PATENT DOCUMENTS

| 10,762,564 | B2 | 9/2020 | Dechu et al. | |
| 2016/0269304 | A1* | 9/2016 | Jacob | H04L 43/0829 |
| 2022/0149632 | A1 | 5/2022 | Walsh | |

FOREIGN PATENT DOCUMENTS

| CA | 2739267 A1 * | 4/2010 | G06Q 10/06 |
| CA | 3043416 A1 * | 11/2019 | G06Q 20/065 |

(Continued)

OTHER PUBLICATIONS

Merrad, Yaçine et al. "Fully Decentralized, Cost-Effective Energy Demand Response Management System with a Smart Contracts-Based Optimal Power Flow Solution for Smart Grids." Energies (Basel) 15.12 (2022): 4461-. Web. (Year: 2022).*

(Continued)

*Primary Examiner* — Akiba K Robinson
(74) *Attorney, Agent, or Firm* — Dority & Manning, P.A.

(57) ABSTRACT

Systems and methods are provided for generating a digital medium of exchange blockchain that is based on a metered amount of generated electrical energy. In one example, a meter computing system coupled to a power generation source can include a sensor that monitors an amount of electrical energy generated by the power generation source over time. The meter computing system can determine when the amount of electrical energy generated by the power generation source reaches a predetermined increment of generated power. The meter computing system can generate a digital unit based on a correlation to the predetermined increment of generated power, wherein the digital unit comprises a unique hashed digital signature that includes unit traceability data. The meter computing system can store the digital unit within a decentralized ledger accessible by the meter computing device.

15 Claims, 6 Drawing Sheets

(51) Int. Cl.
*H04L 9/00* (2022.01)
*H04L 9/32* (2006.01)
*G06Q 50/06* (2012.01)

(52) U.S. Cl.
CPC ......... *G06Q 50/06* (2013.01); *G06Q 2220/00* (2013.01)

(56) References Cited

FOREIGN PATENT DOCUMENTS

| | | | | | |
|---|---|---|---|---|---|
| CN | 107390147 | A | * | 11/2017 | ....... G01R 19/16566 |
| JP | 2018508156 | A | * | 2/2024 | ............. H04L 47/12 |
| JP | 2020510945 | A | * | 2/2024 | ............. H02J 3/381 |
| TW | 200424901 | A | * | 11/2004 | ............. F01K 13/02 |
| WO | WO-2018089843 | A1 | * | 5/2018 | ............. G06F 11/34 |

OTHER PUBLICATIONS

Georgakopoulos, Dimitrios, and Liang-Jie Zhang. "A Blockchain-Based Decentralized Security Architecture for IoT." ICIOT. vol. 10972. Switzerland: Springer International Publishing AG, 2018. 3-18. Web. (Year: 2018).*

Hornberg, "Bitcoin Mining—A Magnet for Cheap Electricity", Medium, May 13, 2019, https://medium.com/@kylehornberg/bitcoin-mining-a-magnet-for-cheap-electricity-53ab75b30181, retrieved on Mar. 21, 2023, 8 pages.

* cited by examiner

SYSTEMS AND METHODS FOR GENERATION OF ENERGY-BACKED DIGITAL UNITS STORED IN A DECENTRALIZED LEDGER

PRIORITY CLAIM

This application claims priority to U.S. patent application Ser. No. 17/863,165, filed Jul. 12, 2022, the disclosure of which is incorporated by reference herein in its entirety.

FIELD

The present disclosure relates generally to improved techniques for generating a digital medium of exchange blockchain that is based on a metered amount of generated electrical energy.

BACKGROUND

Instability, inflation, and a host of other issues plague today's plethora of fiat and crypto currencies. Conventional currencies based on tangible assets having a finite supply, such as currencies backed by gold or other precious metals, can be characterized by inefficiencies due to the limited nature of supply.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method that includes authenticating a meter computing system as a node within a decentralized ledger. The method includes monitoring, by the meter computing system, an amount of electrical energy generated by a power generation source over time. The method includes determining when the amount of electrical energy generated by the power generation source reaches a predetermined increment of generated power. The method includes generating a digital unit based on a correlation to the predetermined increment of generated power. The digital unit includes a unique hashed digital signature that includes unit traceability data. The method includes storing the digital unit within the decentralized ledger.

In some implementations, the computer-implemented method includes determining a type of the power generation source and determining the predetermined increment of generated power based on the type of the power generation source.

In some implementations, the computer-implemented method includes initializing the decentralized ledger using a plurality of designated computing devices configured to serve as nodes, wherein the plurality of designated computing devices comprises the meter computing system and other meter computing systems.

In some implementations, the computer-implemented method includes generating a carbon credit based on the correlation to the predetermined increment of the electrical energy and storing the carbon credit within the decentralized ledger.

In some implementations, the computer-implemented method includes storing at least a defined portion of the predetermined increment of generated power in an energy storage device coupled to the meter computing system.

In some implementations, the computer-implemented method includes periodically monitoring the defined portion of the predetermined increment of generated power in the energy storage device coupled to the meter computing system to determine an actual degradation loss associated with the energy storage device.

In some implementations, the correlation of the digital unit to the predetermined increment of generated power is determined based on a predicted degradation loss associated with the energy storage device. The correlation of the digital unit to the predetermined increment of generated power is updated based on a comparison of the predicted degradation loss associated with the energy storage device to the actual degradation loss over time within the energy storage device.

In some implementations, the computer-implemented method includes monitoring a consumption of the defined portion of the predetermined increment of the generated power stored in the energy storage device. The method also includes storing data within the decentralized ledger indicative of the consumption of the defined portion of the predetermined increment of the generated power stored in the energy storage device.

In some implementations, the data within the decentralized ledger indicative of the consumption of the defined portion of the predetermined increment of the generated power stored in the energy storage device includes a deletion of the digital unit.

In some implementations, the unit traceability data includes at least one of a date when the amount of electrical energy was generated by the power generation source, a time when the amount of electrical energy was generated by the power generation source, a geographical location of the power generation source, or a unique identifier associated with the power generation source.

In some implementations, the computer-implemented method includes resetting the amount of electrical energy monitored by the meter computing system after determining that the predetermined increment of generated power is reached. The method also includes generating another digital unit for storage within the decentralized ledger when the amount of electrical energy generated by the power generation source again reaches the predetermined increment of generated power.

In some implementations, the computer-implemented method includes transmitting valuation data associated with the digital unit to an entity associated with the power generation source.

In some implementations, the computer-implemented method includes generating instructions to initiate display of an updated amount of digital units attributed to an entity associated with the power generation source upon generation of the digital unit.

In some implementations, the computer-implemented method includes providing access for the entity associated with the power generation source to the updated amount of digital units attributed to the entity via an online marketplace for exchanging the digital units among entities.

Another example aspect of the present disclosure is directed to one or more non-transitory, computer-readable media storing instructions that are executable by one or more processors to cause the one or more processors to perform operations. The operations include authenticating a meter computing system as a node within a decentralized ledger. The operations include monitoring, by the meter computing system, an amount of electrical energy generated by a power generation source over time. The operations include determining when the amount of electrical energy generated by the power generation source reaches a predetermined increment of generated power. The operations include generating a digital unit based on a correlation to the predetermined increment of generated power, wherein the digital unit includes a unique hashed digital signature that includes unit traceability data. The operations include storing the digital unit within the decentralized ledger.

Yet another example of the present disclosure is directed to a meter computing system coupled to a power generation source. The meter computing system includes a sensor that monitors an amount of electrical energy generated by the power generation source over time. The meter computing system includes one or more processors and one or more tangible, non-transitory, computer readable media that store instructions that are executable by the one or more processors to cause the meter computing system to perform operations. The operations include determining when the amount of electrical energy generated by the power generation source reaches a predetermined increment of generated power. The operations include generating a digital unit based on a correlation to the predetermined increment of generated power, wherein the digital unit includes a unique hashed digital signature that includes unit traceability data. The operations include storing the digital unit within a decentralized ledger accessible by the meter computing device.

In some implementations, the operations include determining a type of the power generation source and determining the predetermined increment of generated power based on the type of the power generation source.

In some implementations, the operations include initializing the decentralized ledger using a plurality of designated computing devices configured to serve as nodes, wherein the plurality of designated computing devices includes the meter computing system.

In some implementations, the operations include generating a carbon credit based on the correlation to the predetermined increment of the electrical energy and storing the carbon credit within the decentralized ledger.

In some implementations, the operations include storing at least a defined portion of the predetermined increment of generated power in an energy storage device coupled to the meter computing system.

In some implementations, the operations include periodically monitoring the defined portion of the predetermined increment of generated power in the energy storage device coupled to the meter computing system to determine an actual degradation loss associated with the energy storage device.

In some implementations, the correlation of the digital unit to the predetermined increment of generated power is determined based on a predicted degradation loss associated with the energy storage device. The correlation of the digital unit to the predetermined increment of generated power is updated based on a comparison of the predicted degradation loss associated with the energy storage device to the actual degradation loss over time within the energy storage device.

In some implementations, the operations include monitoring a consumption of the defined portion of the predetermined increment of the generated power stored in the energy storage device. The operations also include storing data within the decentralized ledger indicative of the consumption of the defined portion of the predetermined increment of the generated power stored in the energy storage device.

In some implementations, the data within the decentralized ledger indicative of the consumption of the defined portion of the predetermined increment of the generated power stored in the energy storage device includes a deletion of the digital unit.

In some implementations, the unit traceability data includes at least one of a date when the amount of electrical energy was generated by the power generation source, a time when the amount of electrical energy was generated by the power generation source, a geographical location of the power generation source, or a unique identifier associated with the power generation source.

In some implementations, the operations include resetting the amount of electrical energy monitored by the meter computing system after determining that the predetermined increment of generated power is reached. The operations also include generating another digital unit for storage within the decentralized ledger when the amount of electrical energy generated by the power generation source again reaches the predetermined increment of generated power.

In some implementations, the operations include transmitting valuation data associated with the digital unit to an entity associated with the power generation source.

In some implementations, the operations include generating instructions to initiate display of an updated amount of digital units attributed to an entity associated with the power generation source upon generation of the digital unit.

In some implementations, the computer-implemented method includes providing access for the entity associated with the power generation source to the updated amount of digital units attributed to the entity via an online marketplace for exchanging the digital units among entities.

Aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
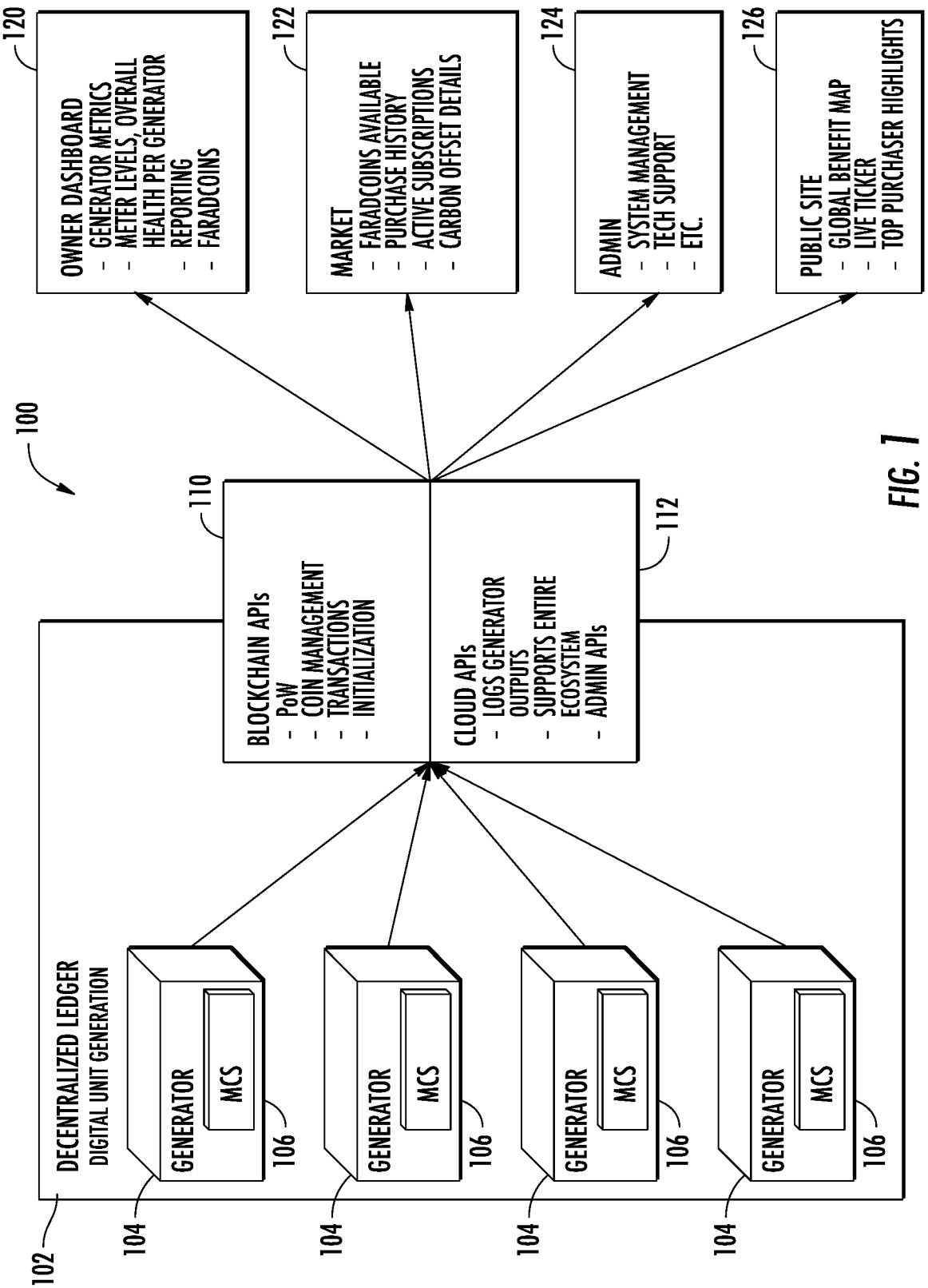
FIG. 1 is a block diagram depicting an example network of nodes within a decentralized ledger according to example implementations of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to improved techniques for generation of a digital medium of exchange blockchain that is based on a metered amount of generated electrical energy. Standalone or networked power generators can respectively include a meter computing system that serves as an API-enabled meter for providing power output monitoring that is encapsulated in a hashed certificate stored in a blockchain. A decentralized ledger associated with the blockchain facilitates the generation of digital units (e.g., digital currency, carbon credits, etc.) that are directly correlated to the amount of metered power. In some examples, increments of the metered power are additionally stored in one or more networked energy storage devices. The digital units are respectively created with unique hashed digital signatures that provide unit traceability data including date, time, location, and/or specific generator identifier for verification of energy production. The digital units can ultimately be relayed and/or accessed via an exchange for buying, selling, trading or otherwise exchanging the digital units among entities within an online marketplace.

In some implementations, the digital units generated in accordance with the disclosed technology can be a digital medium of exchange (e.g., cryptocurrency, coins, non-fungible tokens (NFTs), or other digital medium of exchange) configured to serve as an alternative to conventional fiat currencies. In some implementations, the digital units can be carbon credits. For example, a carbon credit can be determined based on a type of power generation source and the predetermined increments of metered power from the power generation source. In some implementations, the carbon credit can be additionally or alternatively based on a carbon offset value indicative of an amount of carbon emissions reduction achieved by using a clean/renewable power generation device compared with a conventional power generation device. In some implementations, the determined carbon credits can be stored within the decentralized ledger in addition to the generated digital units.

In some implementations, a decentralized ledger or distributed ledger utilized for implementation of the disclosed technology employs blockchain technology. When the decentralized ledger includes blockchain, the data defining the subject digital units and/or carbon credits can be organized into blocks which are chained together in an append-only mode as blocks are shared among independent computers or nodes within the decentralized ledger. The number and location of nodes within the decentralized ledger can vary over time and geographic location as long as the nodes are initialized and authenticated before incorporation. The specific configurations of hashing algorithms, digital signature algorithms, and other implementation details of the decentralized ledger can be varied while still remaining within the spirit and scope of the disclosed technology. The generation of digital units and/or carbon credits in accordance with the disclosed technology can be considered as sources of origination (e.g., genesis blocks) within the blockchain infrastructure. As such, storing digital unit(s) and/or carbon credit(s) in the decentralized ledger can more particularly correspond to storing a block (e.g., a genesis block) in the blockchain.

In some implementations, defined portions of the predetermined increments of electrical energy generated by a given power generation source can be stored in an energy storage device coupled to the meter computing system. The energy storage device can be geographically collocated with the meter computing system or can be remote from the meter computing system and coupled electrically and communicatively. The energy storage device can include an electrochemical battery bank (e.g., lithium-ion batteries), a capacitor stack (e.g., a plurality of super capacitors such as but not limited to graphene supercapacitors), a flywheel, a water pumping storage device, or any combination of suitable energy storage devices. By coupling a digital unit with the stored portion of the electrical energy increments, the digital units can be energy-backed digital assets from a physical perspective.

The technology of the present disclosure can provide a number of benefits and technical effects. For instance, the technology of the present disclosure can be used to generate energy-backed digital assets (e.g., digital units, carbon credits, etc.) that are backed by a commodity having intrinsic value by nature of electrical energy corresponding to a fundamental ability to perform work. However, unlike traditional fiat currencies, an energy-backed digital asset is not as susceptible to instability, inflation, and inefficiencies because of limited supply. In addition, because energy can be created through power generation, systems and methods of exchange using energy-backed digital assets can grow with economic and societal needs as opposed to gold-backed assets that are limited because of finite supply.

Another advantage and technical effect of the disclosed technology is realized by providing energy-backed digital assets within a decentralized ledger (e.g., blockchain-enabled) framework. Use of a decentralized or distributed ledger can beneficially ensure high security and data integrity within both the generation of digital units and/or carbon credits as well as transactions involving such assets. The blockchain technology can advantageously facilitate reduced probability of identity theft or impersonation within the system, better safeguard against malicious intermediaries or unintended modifications, and provide assurances that unauthorized parties do not gain access to information exchanged in a specific transaction.

With reference now to the Figures, example embodiments of the present disclosure will be discussed in further detail.

FIG. 1 depicts an example system 100 according to example embodiments of the present disclosure. The system 100 can include a network of nodes within a decentralized ledger 102. For example, meter computing systems (MCS) 106 respectively coupled to power generators 104 can serve as nodes within the decentralized ledger 102. Each meter computing system 106 can be an API-enabled meter for providing power output monitoring that is encapsulated in a hashed certificate stored in a blockchain. Decentralized ledger 102 facilitates the generation of digital units (e.g., digital currency, carbon credits, etc.) that are directly correlated to the amount of metered power (e.g., power metered by the respective MCSs 106.

In some implementations, decentralized ledger 102 (or distributed ledger) employs blockchain technology. When the decentralized ledger 102 includes blockchain, the data defining the subject digital units and/or carbon credits can be organized into blocks which are chained together in an append-only mode as blocks are shared among independent computers or nodes within the decentralized ledger 102. The number and location of nodes within the decentralized ledger 102 can vary over time and geographic location as long as the nodes are initialized and authenticated before incorporation. The specific configurations of hashing algorithms, digital signature algorithms, and other implementation details of the decentralized ledger can be varied while still remaining within the spirit and scope of the disclosed technology. The generation of digital units and/or carbon credits in accordance with the disclosed technology can be considered as sources of origination (e.g., genesis blocks) within the blockchain infrastructure. As such, storing digital unit(s) and/or carbon credit(s) in the decentralized ledger 102 can more particularly correspond to storing a block (e.g., a genesis block) in the blockchain.

In some implementations, the power generators 104 can include one or more clean energy power generators that are respectively characterized by a generally low level of carbon emissions output during power generation. For example, a clean energy power generator in accordance with the disclosed technology can be characterized by a level of carbon emissions that is below a predetermined threshold level as defined by an applicable regulatory body. A precise level of carbon emissions for a given power generator 104 can be determined by a meter computing system 106 such that a carbon offset or carbon credit can be determined and generated for the given power generator 104.

In some implementations, the power generators 104 can include one or more renewable energy power generators, such as but not limited to a hydropower generator, a nuclear generator, a wind generator, a solar generator, a magnetic power generator, and/or a hybrid power generator that includes a combination of one or more of such example renewable energy power generation technologies. A specific type of the renewable power generator can be determined in accordance with the disclosed systems and methods such that a correlation of a predetermined increment of monitored electrical energy to a digital unit of value is based on the specific type of renewable energy.

For instance, in a first generator type (e.g., magnetic generators), a first predetermined increment of monitored electrical energy (e.g., 100 kilo-Watt hours (kWh)) can correspond to valuation of a digital unit. For a second generator type (e.g., solar generators), a second predetermined increment of monitored electrical energy (e.g., 500 kWh) that is different than the first predetermined increment can correspond to valuation of a digital unit. In a third generator type (e.g., wind generators), a third predetermined increment of monitored electrical energy (e.g., 1,000 kWh) that is different than the first predetermined amount and second predetermined amount of electrical energy can be determined to correspond to valuation of the same digital unit. In a fourth generator type (e.g., hydro generators), a fourth predetermined increment of monitored electrical energy (e.g., 1,500 kWh) that is different than the first predetermined amount, the second predetermined amount, and the third predetermined amount of electrical energy can be determined to correspond to a digital unit. Different specific combinations of power generator types and corresponding predetermined increments of monitored electrical energy are within the spirit and scope of the disclosed technology.

In some examples, the valuation established to correlate a digital unit and/or carbon credit to a corresponding increment of electrical energy can be dynamically determined based on weighted formulas or other algorithms. In some embodiments, a machine-learned model (e.g., a neural network) can be trained using a series of ground-truth data to dynamically determine a valuation correlation among a digital unit and/or carbon credit, type of power generator, and increment of metered electrical energy. When machine-learning technology is employed, a machine-learned model can be or can otherwise include various machine-learned models such as, for example, neural networks (e.g., deep neural networks or other types of models including linear models and/or non-linear models). Example neural networks include feed-forward neural networks, recurrent neural networks (e.g., long short-term memory recurrent neural networks), convolutional neural networks, or other forms of neural networks.

The power generators 104 and different portions of electrical energy generated thereby can be respectively associated with various entities. For example, entities associated with the power generator 104 or respective portions thereof can include but are not limited to utilities, commercial entities, residential entities, grid operators, vertically integrated utilities, governments, municipalities, heavy industries, data centers, energy backup facilities, mining facilities, electrical vehicle (EV) charging stations or networks, or other power consumers.

Figure 2:
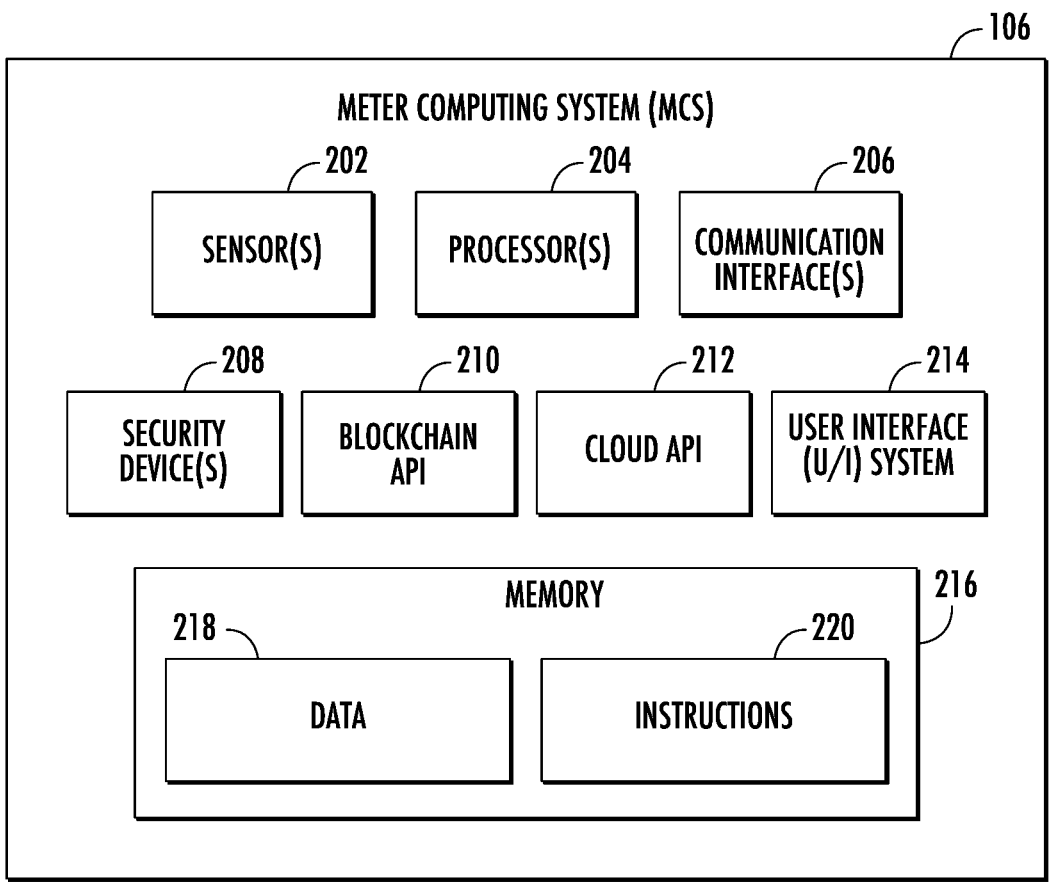
FIG. 2 is a block diagram depicting a meter computing system according to example implementations of the present disclosure.
Figure 3:
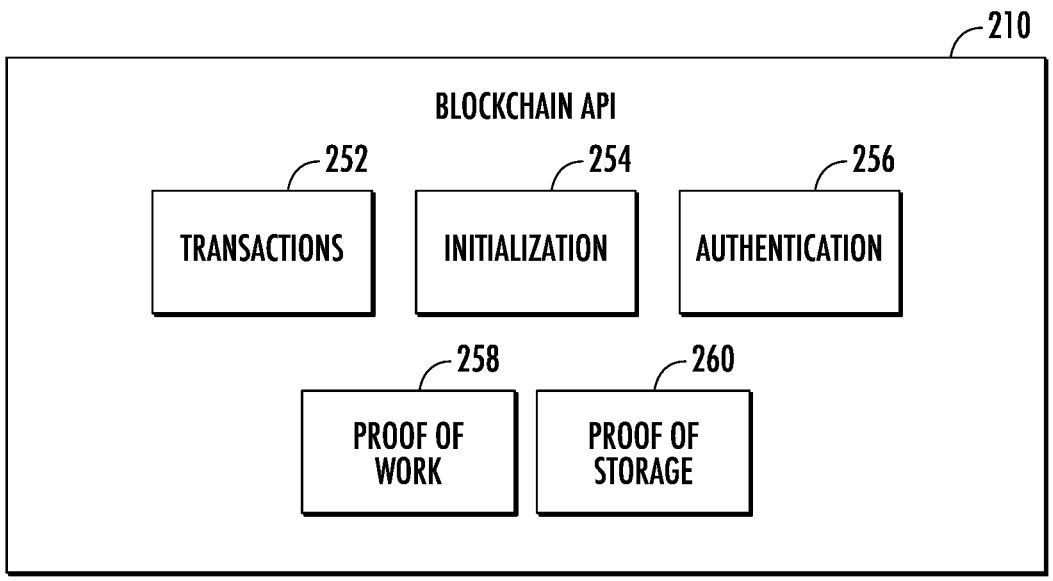
FIG. 3 is a block diagram depicting a blockchain API according to example embodiments of the present disclosure.
Figure 6:
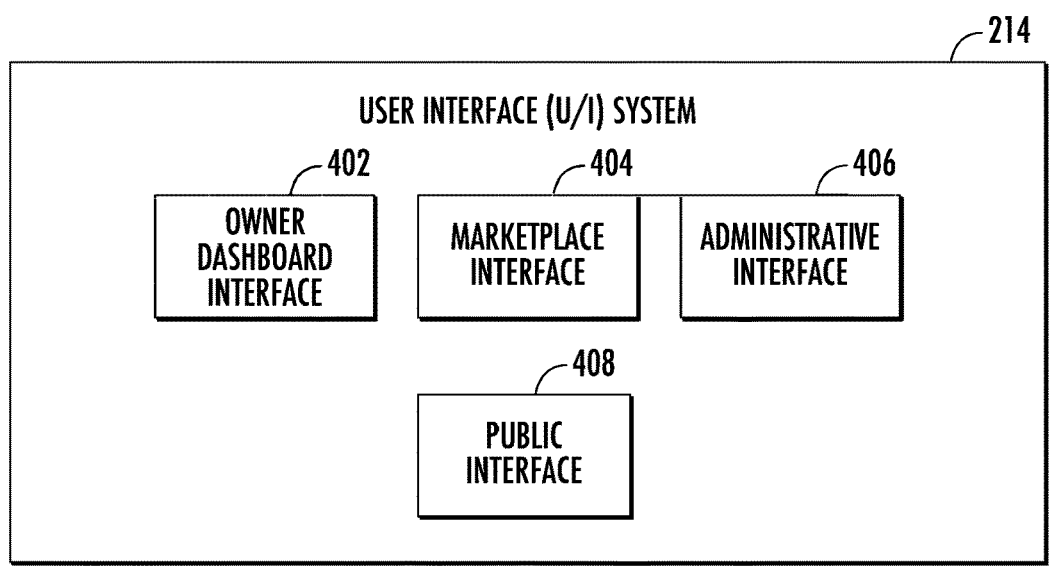
FIG. 6 is a block diagram depicting an example user interface system according to example embodiments of the present disclosure.

Referring still to FIG. 1, the plurality of MCSs 106 respectively include a blockchain application programming interface (API) 110 and cloud API 112, which are discussed in greater detail relative to FIGS. 2-3 and a plurality of user interfaces (e.g., an owner dashboard interface 120, a marketplace interface 122, an administrative interface 124, and a public interface 126) which are discussed in greater detail relative to FIG. 6.

FIG. 2 is a block diagram depicting a meter computing system 106 according to example implementations of the present disclosure. A meter computing system 106 in accordance with the disclosed technology can include, for example, one or more sensors 202 and one or more computing devices that include one or more processors 204 and one or more non-transitory, computer-readable media (e.g., memory) 216. The meter computing system 106 can also include one or more communication interface(s) 206 for coupling the meter computing system 106 to a network, a security device 208, a blockchain application programming interface (API) 210, a cloud API 212, and/or a user interface system 214. The memory 216 of the meter computing system 106 can store data 218 and/or instructions 220 that are executable by the one or more processors 204 to cause the one or more processors 204 to perform operations.

In some implementations, the sensor(s) 202 of the meter computing system 106 can be configured to monitor an amount of electrical energy generated by the power generation source 104 over time. For example, the sensor(s) 202 can correspond to or include a current transformer. For example, a current transformer can use magnetic field measurements to determine a current flowing from the power generation source 104 through the sensor 202.

The meter computing system 106 includes one or more processors 204 and a memory 216. The one or more processors 204 can be any suitable processing device (e.g., a processor core, a microprocessor, an ASIC, a FPGA, a controller, a microcontroller, etc.) and can be one processor or a plurality of processors that are operatively connected. The memory 216 can include one or more non-transitory computer-readable storage media, such as RAM, ROM, EEPROM, EPROM, one or more memory devices, flash memory devices, etc., and combinations thereof.

The memory 216 can store information that can be accessed by the one or more processors 204. For instance, the memory 216 (e.g., one or more non-transitory computer-readable storage mediums, memory devices) can store data 218 that can be obtained, received, accessed, written, manipulated, created, and/or stored. The data 218 can include, for instance, data indicative of the digital units and/or carbon credits (including but not limited to unit traceability data), data associated with the decentralized ledger, energy storage data, etc. as described herein. In some implementations, the meter computing system 106 can obtain data from one or more memory device(s) that are remote from the meter computing system 106.

The memory 216 can also store computer-readable instructions 220 that can be executed by the one or more processors 204. The instructions 220 can be software written in any suitable programming language or can be implemented in hardware. Additionally, or alternatively, the instructions 220 can be executed in logically and/or virtually separate threads on processor(s) 204. For example, the memory 216 can store instructions 220 that when executed by the one or more processors 204 cause the one or more processors 204 to perform any of the operations and/or functions described herein, including, for example, determining when an amount of electrical energy generated by the power generation source reaches a predetermined increment of generated power, generating a digital unit based on a correlation to the predetermined increment of generated power, and storing the digital unit within the decentralized ledger.

In some implementations, the meter computing system 106 includes one or more server computing devices. If the meter computing system 106 includes multiple server computing devices, such server computing devices can operate according to various computing architectures, including, for example, sequential computing architectures, parallel computing architectures, or some combination thereof.

In some implementations, the meter computing system 106 can additionally include one or more security devices 208 for ensuring the integrity of the functionality of sensor(s) 202 or other aspects of the meter computing system 106. For example, the security device(s) 208 can include one or more motion sensors such as but not limited to an accelerometer, a gyroscope, an inertial measurement unit (IMU) sensor, or the like that are configured to determine an operational pattern associated with a meter computing system 106 and to ensure continued operation consistent with the determined operational pattern. For instance, an operational pattern can include: (i) a unique identifier associated with the meter computing system and/or associated power generation source; and/or (ii) motion pattern data indicative of one or more motion patterns of the meter computing system and/or associated power generation source. The unique identifier can be determined from a cryptographic generator, for example but not limited to a pseudo random number generator (PRNG) or a quantum processor configured to generate a unique q-bit for association with the meter computing system and/or associated power generation source. The one or more motion patterns can correspond to a vibration pattern, a position pattern, and/or an orientation pattern. By determining an initial operational pattern for a given meter computing system 106 and periodically analyzing subsequent instances of the operational pattern, significant changes of the operational pattern can be detected and communicated over one or more networks as a notification of potential system tampering.

Figure 4:
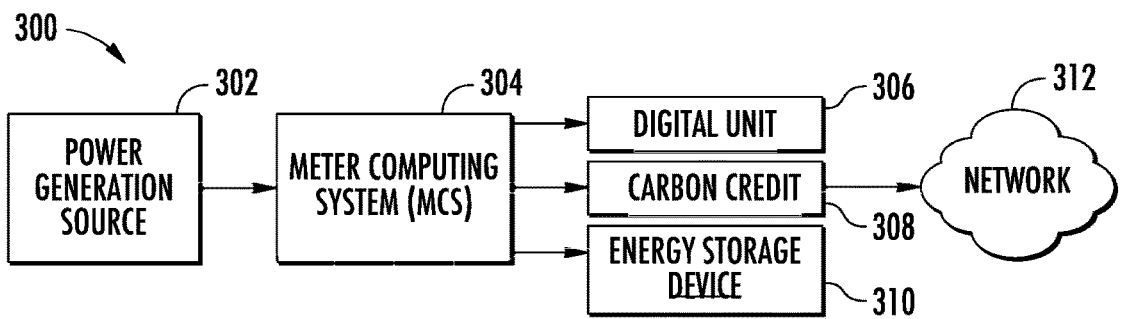
FIG. 4 is a block diagram depicting a first power flow configuration according to example implementations of the present disclosure.
Figure 5:
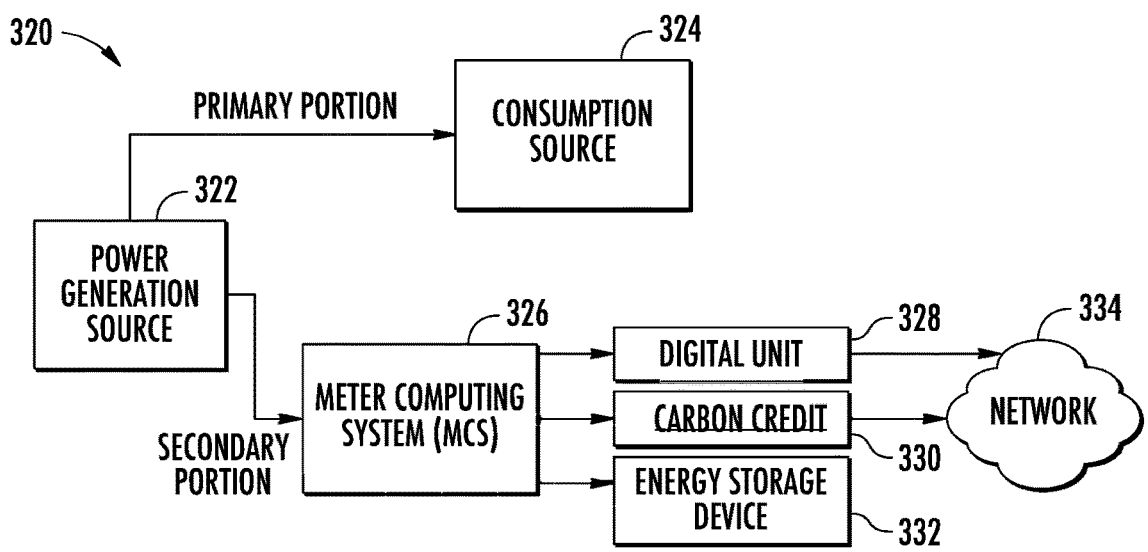
FIG. 5 is a block diagram depicting a second power flow configuration according to example implementations of the present disclosure.

In some implementations, the meter computing system 106 can additionally include one or more communication interfaces 206 for coupling the meter computing system 106 to a network (e.g., network 312 of FIG. 4 or network 334 of FIG. 5). The communication interfaces 206 can be used to communicate with one or more systems or devices, including systems or devices that are remotely located from the meter computing system 106 (e.g., other nodes within the decentralized ledger). The communication interface(s) 206 can include any circuits, components, software, etc. for communicating with one or more networks. The communication interface(s) 206 can include, for example, one or more of a communications controller, receiver, transceiver, transmitter, port, conductors, software and/or hardware for communicating data.

In some implementations, the meter computing system 106 can additionally include a blockchain API 210 of the meter computing system 106. In some implementations, blockchain API 210 of FIGS. 2-3 corresponds to blockchain API 110 of FIG. 1. As more particularly illustrated in FIG. 3, the blockchain API 210 can include one or more software segments respectively associated with transactions 252, initialization 254, authentication 256, proof of work 258, and/or proof of storage 260.

With more particular reference to FIG. 3, a transactions software segment 252 of the blockchain API 210 can include coded rules and/or algorithms configured to transmit valuation data associated with the digital unit to an entity associated with the power generation source 104. For example, if the power generation source 104 is owned or otherwise attributed to a given entity, then that entity can be designated as owner of the digital units, carbon credits, and or stored portions of power associated with the power generation source 104. In some implementations, the transactions software segment 252 can generate instructions to initiate display of an updated amount of digital units attributed to an entity associated with the power generation source 104 upon generation of the digital unit. In some implementations, access can be provided for the entity associated with the power generation source 104 to the updated amount of digital units via an online marketplace for exchanging the digital units among entities. In some implementations, blockchain data associated with transactions of the generated digital units and/or carbon credits can be separate blockchain from the originating blockchain that tracks generation of the digital units. By employing two separate blockchains for generation and transactions, additional system security can help prevent unauthorized generation of digital assets.

An initialization software segment 254 of the blockchain API 210 can include coded rules and/or algorithms configured to initialize the decentralized ledger using a plurality of designated computing devices configured to serve as nodes, wherein the plurality of designated computing devices includes the meter computing system. In some implementations, the initialization software segment 254 can facilitate the security protocol as part of initializing a meter computing device within a larger network of devices. For example, the initialization software segment 254 can determine an operational pattern associated with a meter computing system and to ensure continued operation consistent with the determined operational pattern. For instance, an operational pattern can include: (i) a unique identifier associated with the meter computing system and/or associated power generation source; and/or (ii) motion pattern data indicative of one or more motion patterns of the meter computing system and/or associated power generation source.

An authentication software segment 256 of the blockchain API 210 can include coded rules and/or algorithms configured to authenticate a meter computing system as a node within a decentralized ledger. For example, in a blockchain implementation, data defining the digital units can be organized into blocks which are chained together and shared among independent computers or nodes within the decentralized or distributed ledger. In some implementations, the nodes within the decentralized ledger can include multiple meter computing systems. In some implementations, the nodes within the decentralized ledger can additionally or alternatively include one or more dedicated, secure private servers. The various nodes can contain hashed representations of ledger data associated with the digital units. Daily updates can be implemented to the nodes to maintain authenticity of the ledger. For some nodes, a non-public ledger can be accessible via API calls. In some implementations, a grid of nodes is configured with a certain number of nodes established for respective geographic locations (e.g., countries, states, municipalities). The geographical location of nodes can be included in hashed identifiers, which may be tracked to help ensure that digital units exchanged in the marketplace are collocated with geographic locations of power generation sources. In other words, local transactions can be kept local when possible.

A proof of work software segment 258 of the blockchain API 210 can include coded rules and/or algorithms configured to access the amount of electrical energy generated by a power generation source 104 over time as monitored by the sensor(s) 202 of the meter computing system 106. The proof of work software segment 258 can determine when the amount of electrical energy generated by the power generation source 104 reaches a predetermined increment of generated power. In some implementations, the proof of work software segment 258 determines a type of the power generation source 104 (e.g., magnetic generator, solar generator, wind generator, hydro generator, etc.). The predetermined increment of the electrical energy can be based on the type of the power generation source 104 and can be different for different types of power generators. The proof of work software segment 258 can generate a digital unit (e.g., digital unit 306 of FIG. 4 and/or digital unit 328 of FIG. 5) based on a correlation to the predetermined increment of generated power. The digital unit can then be stored in the decentralized ledger (e.g., decentralized ledger 102 of FIG. 1). The digital unit can include a unique hashed digital signature that includes unit traceability data (e.g., a date when the amount of electrical energy was generated by the power generation source, a time when the amount of electrical energy was generated by the power generation source, a geographical location of the power generation source, and/or a unique identifier associated with the power generation source). The proof of work software segment 258 of the blockchain API 210 can reset the amount of electrical energy monitored by the meter computing system 106 after determining that the predetermined increment of generated power is reached. Subsequent digital units can then be logged and stored within the decentralized ledger 102 when the amount of electrical energy generated by the power generation source 104 again reaches the predetermined increment of generated power. In this manner, digital units are continuously generated based on the incremental accumulation of monitored power at the power generation source 104.

When digital units are coupled with stored portions of power, a proof of storage software segment 260 of the blockchain API 210 can include coded rules and/or algorithms configured to periodically monitor the defined portion(s) of the predetermined increments of electrical energy in the energy storage device (e.g., energy storage device 310 of FIG. 4 and/or energy storage device 332 of FIG. 5) to determine an actual degradation loss associated with the energy storage device. The actual degradation loss can be a degradation loss over time, a degradation loss associated with the type of energy storage device, and/or a degradation loss associated with a distance of transmission of the electrical energy from the power generation source to the energy storage device. The proof of storage software segment 260 of the blockchain API 210 can correlate the digital unit to the predetermined increment of generated power. The correlation of the digital unit to the predetermined increment of generated power can be initially determined based on a predicted degradation loss associated with the energy storage device. The correlation of the digital unit to the predetermined increment of generated power can be periodically updated based on a comparison of the predicted degradation loss associated with the energy storage device to the actual degradation loss associated with the energy storage device. The correlation of the digital unit to the predetermined increment of generated power can be additionally or alternatively updated to reflect a cost of storage over time.

In some implementations, the proof of storage software segment 260 can also be configured to monitor consumption of the defined portion of the predetermined increment of the electrical energy stored in the energy storage device. Consumption of the stored portions of electrical energy can occur in a number of ways, for example, indicative of the power being converted into useful work. For example, consumption can occur upon sending power over power lines to a utility or grid operator, transferring stored power to portable capacitors or batteries, and/or consuming power from node storage at a location associated with a residence, business, commercial entity or other consumer. Upon identification of consumption, data can be stored within the decentralized ledger 102 indicative of the consumption of the defined portion of the predetermined increment of the electrical energy stored in the energy storage device. For example, the data within the decentralized ledger 102 indicative of the consumption of the predetermined increment of the defined portion of the predetermined increment of the electrical energy stored in the energy storage device can correspond to data indicative of a deletion of the digital unit. In other words, when the increment of electrical energy backing the digital unit is consumed, the digital unit can be considered as spent or reduced in value by a proportionate amount based on the consumed energy.

Referring again to FIG. 2, in some implementations, the meter computing system 106 can additionally include a cloud API 212 configured to log generator outputs from the coupled power generation source(s) 104 and/or to provide administrative support for managing various networked components of the ecosystem including but not limited to the decentralized ledger 102, the computing system nodes, the meter computing devices 106, etc. In some implementations, cloud API 212 of FIGS. 2-3 corresponds to cloud API 112 of FIG. 1.

In some implementations, the user interface system 214 of the meter computing device 106 can include one or more online portals and/or associated graphical user interfaces for authorized access by various entities associated with the disclosed technology. One or more of the interfaces provided as part of the user interface system 214 can include security credentials to obtain secure access to the interfaces, such as secure password-matched login credentials.

For example, as more particularly illustrated in FIG. 6, the user interface system 214 can include an owner dashboard interface 402 for owners of the generated digital units and/or carbon credits to access information about the generated assets (e.g., generator metrics, meter levels, overall health per generator, reporting, and/or updated amounts of digital units and carbon credits). In some implementations, the owner dashboard interface 402 is associated with entities that own or operate the corresponding power generation sources 104 and/or associated meter computing systems 106. In some implementations, owner dashboard interface 402 of FIG. 4 corresponds to owner dashboard interface 120 of FIG. 1.

The user interface system 214 can additionally or alternatively include a marketplace interface 404 configured to provide online access for entities (e.g., the entity associated with the power generation source, entities that own digital units and/or carbon credits) to the digital units and/or carbon credits via an online marketplace for exchanging the digital units and/or carbon credits among other authorized entities. The marketplace interface 404 can additionally or alternatively include a number of available digital assets, a purchase/sale history, active subscriptions, carbon offset details, etc. In some implementations, marketplace interface 404 of FIG. 4 corresponds to marketplace interface 122 of FIG. 1.

The user interface system 214 can additionally or alternatively include an administrative interface 406 for managing technological aspects and entity interactions associated with the disclosed technology and/or providing system management, technical support, etc. In some implementations, administrative interface 406 of FIG. 4 corresponds to administrative interface 124 of FIG. 1.

The user interface system 214 can additionally or alternatively include a public interface 408 for access by unauthorized entities to obtain information or purchasing options for digital units and/or carbon credits generated in accordance with the disclosed technologies. For example, a public interface 408 can include a global benefit map, a live ticker, top purchaser highlights or other information associated with generation and exchange of the subject digital units and/or carbon credits. In some implementations, public interface 408 of FIG. 4 corresponds to public interface 126 of FIG. 1.

Referring now to FIGS. 4-5, FIG. 4 is a block diagram depicting a first power flow configuration 300 and FIG. 5 is a block diagram depicting a second power flow configuration 320 according to example implementations of the present disclosure.

In FIG. 4, a standalone or networked power generation source 302 can respectively include or be coupled to a meter computing system 304 that serves as an API-enabled meter for providing power output monitoring that is encapsulated in a hashed certificate stored in a blockchain. Meter computing system 304 is configured to monitor all power generated by the power generator source 302. A decentralized ledger associated with the blockchain facilitates the generation of digital units 306 and/or carbon credits 308 that are directly correlated to the amount of metered power. In some examples, increments of the metered power are additionally stored in one or more networked energy storage devices 310. The digital units 306 and/or carbon credits 308 are respectively created with unique hashed digital signatures that provide unit traceability data including date, time, location, and/or specific generator identifier for verification of energy production. The digital units 306 and/or carbon credits 308 can ultimately be relayed and/or accessed via an exchange for buying, selling, trading or otherwise exchanging the digital units among entities within an online marketplace. The exchange can be accessed by a user via network 312.

In FIG. 5, a primary portion of electrical energy from power generation source 322 is provided to a consumption source 324, while a secondary portion of electrical energy from the power generation source 322 is provided to the meter computing system 326 and ultimately converted to digital units 328 and/or carbon credits 330 in accordance with the disclosed technology. The implementation depicted in FIG. 5 may be especially advantageous when power generator source 322 corresponds to a renewable power generation source such as a wind generator and/or solar generators. In such instance, a first portion of electrical energy corresponds to a primary portion of generated power for storage and/or consumption by consumption source 324, and a second portion of electrical energy corresponds to an excess portion of generated power (e.g., a portion of generated power that is difficult to capture as part of the primary portion) for monitoring and conversion to digital units by meter computing system 326.

Referring still to FIG. 5, a decentralized ledger associated with the blockchain facilitates the generation of digital units 328 and/or carbon credits 330 that are directly correlated to the amount of metered power at MCS 326. In some examples, increments of the metered power are additionally stored in one or more networked energy storage devices 332. The digital units 328 and/or carbon credits 330 are respectively created with unique hashed digital signatures that provide unit traceability data including date, time, location, and/or specific generator identifier for verification of energy production. The digital units 328 and/or carbon credits 330 can ultimately be relayed and/or accessed via an exchange for buying, selling, trading or otherwise exchanging the digital units among entities within an online marketplace. The exchange can be accessed by a user via network 334.

In the implementations of FIGS. 4-5, the digital units 306/328 can be a digital medium of exchange (e.g., cryptocurrency, coins, non-fungible tokens (NFTs), or other digital medium of exchange) configured to serve as an alternative to conventional fiat currencies. In some implementations, the digital units 306/328 can be carbon credits. In other implementations, carbon credits 308/330 are generated in addition to digital units 306/328. A carbon credit 308/330 can be determined based on a type of power generation source and the predetermined increments of metered power from the power generation source. In some implementations, the carbon credit 308/330 can be additionally or alternatively based on a carbon offset value indicative of an amount of carbon emissions reduction achieved by using a clean/renewable power generation device compared with a conventional power generation device. In some implementations, the determined carbon credits 308/330 can be stored within the decentralized ledger 102 in addition to the generated digital units 306/328.

In the implementations of FIGS. 4-5 when defined portions of the predetermined increments of electrical energy generated by a given power generation source 302/322 are stored in energy storage device 310/332 coupled to the meter computing system 304/326, the energy storage device 310/332 can be geographically collocated with the meter computing system 304/326 or can be remote from the meter computing system 304/326 and coupled electrically and communicatively. The energy storage device 310/332 can include an electrochemical battery bank (e.g., lithium-ion batteries), a capacitor stack (e.g., a plurality of super capacitors such as but not limited to graphene supercapacitors), a flywheel, a water pumping storage device, or any combination of suitable energy storage devices. By coupling a digital unit with the stored portion of the electrical energy increments, the digital units can be energy-backed digital assets from a physical perspective.

In some implementations, the network(s) 312/334 of FIGS. 4-5 can be any type of network or combination of networks that allows for communication between devices. In some embodiments, the network(s) 312/334 can include one or more of a local area network, wide area network, the Internet, secure network, cellular network, mesh network, peer-to-peer communication link and/or some combination thereof and can include any number of wired or wireless links. Communication over the network(s) 312/334 can be accomplished, for instance, via a network interface using any type of protocol, protection scheme, encoding, format, packaging, etc.

Figure 7:
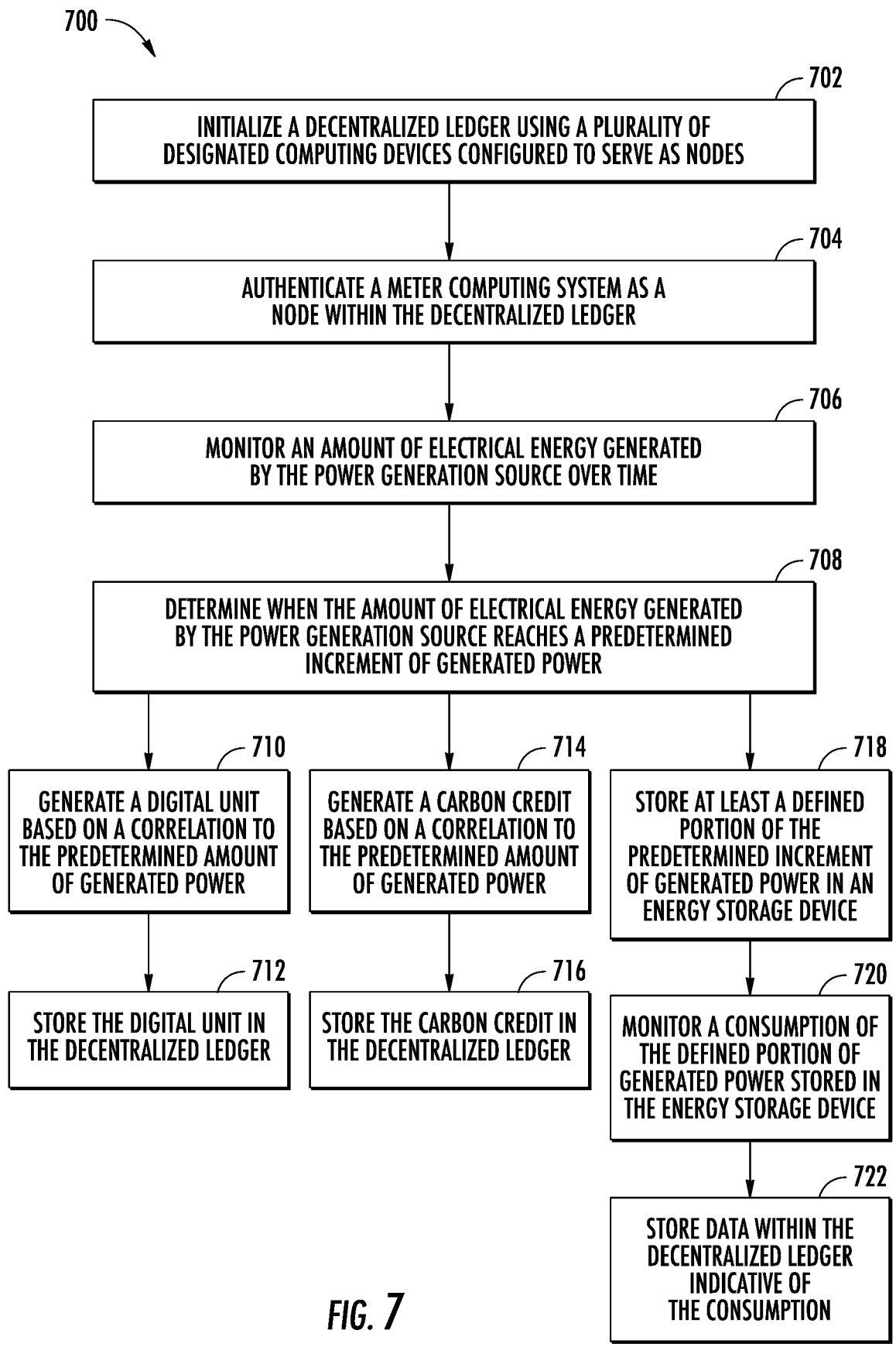
FIG. 7 depicts a flowchart diagram of an example method for generating energy-backed digital units stored in a blockchain according to example embodiments of the present disclosure.

FIG. 7 is a flowchart diagram depicting an example process 700 for generating energy-backed digital units stored in a blockchain according to example embodiments of the disclosed technology. Although FIG. 7 depicts steps/operations performed in a particular order for purposes of illustration and discussion, the methods of the present disclosure are not limited to the particularly illustrated order or arrangement. The various steps of process 700 can be omitted, rearranged, combined, and/or adapted in various ways without deviating from the scope of the present disclosure. In example embodiments, process 700 may be performed by a meter computing system such as meter computing system 106.

At 702, a computing system, such as meter computing system 106, initializes a decentralized ledger using a plurality of designated computing devices configured to serve as nodes. For example, the plurality of designated computing devices configured to serve as nodes within the decentralized ledger can include the meter computing system 106.

At 704, a computing system, such as meter computing system 106, authenticates the meter computing system as a node within the decentralized ledger. For example, in a blockchain implementation, data defining the digital units can be organized into blocks which are chained together and shared among independent computers or nodes within the decentralized or distributed ledger. In some implementations, the nodes within the decentralized ledger can include multiple meter computing systems. In some implementations, the nodes within the decentralized ledger can additionally or alternatively include one or more dedicated, secure private servers. The various nodes can contain hashed representations of ledger data associated with the digital units. Daily updates can be implemented to the nodes to maintain authenticity of the ledger. For some nodes, a non-public ledger can be accessible via API calls. In some implementations, a grid of nodes is configured with a certain number of nodes established for respective geographic locations (e.g., countries, states, municipalities). The geographical location of nodes can be included in hashed identifiers, which may be tracked to help ensure that digital units exchanged in the marketplace are collocated with geographic locations of power generation sources.

At 706, a computing system, such as meter computing system 106, monitors an amount of electrical energy generated by a power generation source over time.

At 708, a computing system, such as meter computing system 106, determines when the amount of electrical energy generated by the power generation source reaches a predetermined increment of generated power.

At 710, a computing system, such as meter computing system 106, generates a digital unit based on a correlation to the predetermined increment of generated power. The digital unit can include, for example, a unique hashed digital signature that includes unit traceability data. In some implementations, the unit traceability data can include at least one of a date when the amount of electrical energy was generated by the power generation source, a time when the amount of electrical energy was generated by the power generation source, a geographical location of the power generation source, or a unique identifier associated with the power generation source.

At 712, a computing system, such as meter computing system 106, stores the digital unit within the decentralized ledger.

At 714, a computing system, such as meter computing system 106, generates a carbon credit based on the correlation to the predetermined amount of generated power.

At 716, a computing system, such as meter computing system 106, stores the carbon credit within the decentralized ledger.

At 718, a computing system, such as meter computing system 106, stores at least a defined portion of the predetermined increment of generated power in an energy storage device coupled to the meter computing system.

At 720, a computing system, such as meter computing system 106, monitors a consumption of the defined portion of the predetermined increment of the generated power stored in the energy storage device at 718.

At 722, a computing system, such as meter computing system 106, stores data within the decentralized ledger indicative of the consumption of the defined portion of the predetermined increment of the generated power stored in the energy storage device. For example, the data within the decentralized ledger indicative of the consumption of the defined portion of the predetermined increment of the generated power stored in the energy storage device corresponds to a reduction or a deletion of the digital unit valuation upon consumption.

Figure 8:
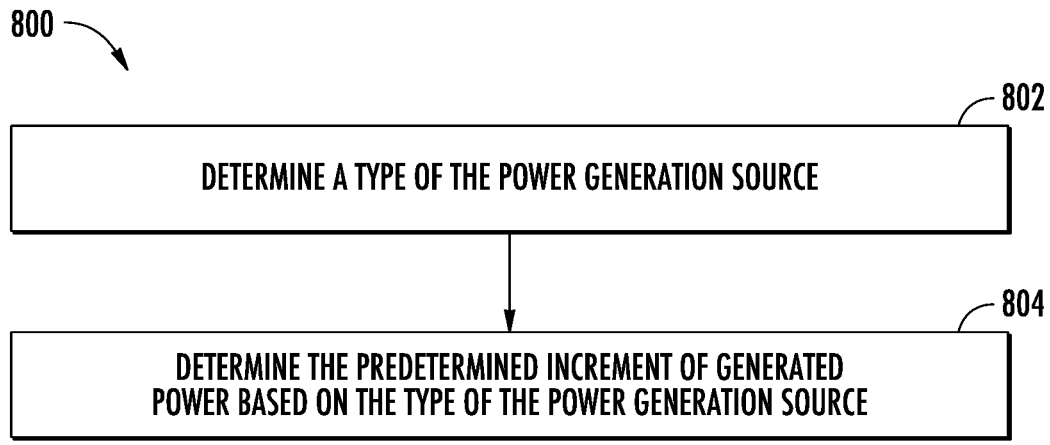
FIG. 8 depicts a flowchart diagram of an example method for determining a predetermined increment of generated power according to example embodiments of the present disclosure.

FIG. 8 is a flowchart diagram depicting an example process 800 for determining a predetermined increment of generated power according to example embodiments of the disclosed technology. For example, process 800 can be implemented as part of or in addition to the operations of process 700 (e.g., operation 708 by which a determination is made that an amount of electrical energy generated by the power generation source reaches a predetermined increment of power). Although FIG. 8 depicts steps/operations performed in a particular order for purposes of illustration and discussion, the methods of the present disclosure are not limited to the particularly illustrated order or arrangement. The various steps of process 800 can be omitted, rearranged, combined, and/or adapted in various ways without deviating from the scope of the present disclosure. In example embodiments, process 800 may be performed by a meter computing system such as meter computing system 106.

At 802, a computing system, such as meter computing system 106, determines a type of the power generation source.

At 804, a computing system, such as meter computing system 106, determines the predetermined increment of generated power based on the type of the power generation source determined at 802.

Figure 9:
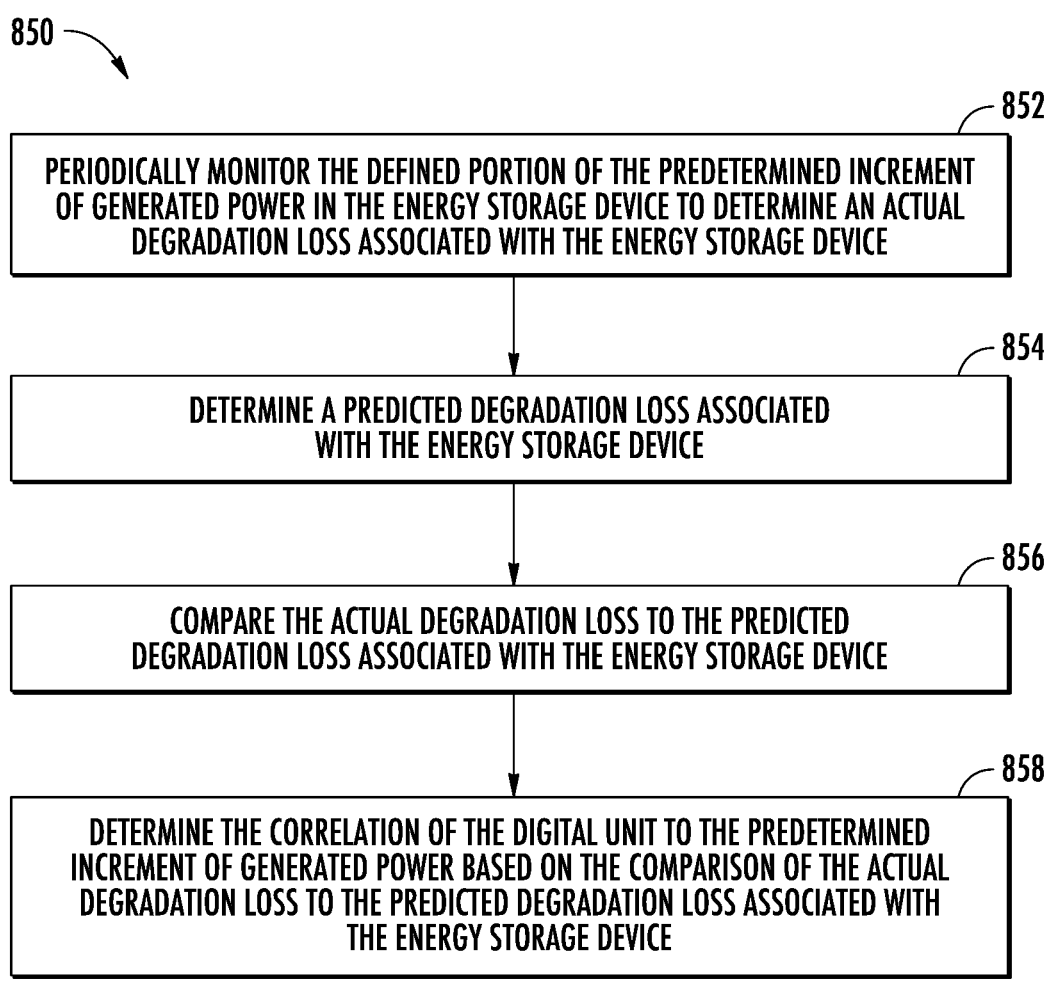
FIG. 9 depicts a flowchart diagram of an example method for evaluating degradation loss according to example embodiments of the present disclosure.

FIG. 9 is a flowchart diagram depicting an example process 850 for evaluating degradation loss according to example embodiments of the disclosed technology. For example, process 850 can be implemented as part of or in addition to the operations of process 700. Although FIG. 9 depicts steps/operations performed in a particular order for purposes of illustration and discussion, the methods of the present disclosure are not limited to the particularly illustrated order or arrangement. The various steps of process 850 can be omitted, rearranged, combined, and/or adapted in various ways without deviating from the scope of the present disclosure. In example embodiments, process 850 may be performed by a meter computing system such as meter computing system 106.

At 852, a computing system, such as meter computing system 106, periodically monitors the defined portion of the predetermined increment of generated power in the energy storage device coupled to the meter computing system to determine an actual degradation loss associated with the energy storage device.

At 854, a computing system, such as meter computing system 106, determines a predicted degradation loss associated with the energy storage device.

At 856, a computing device, such as meter computing system 106, compares the actual degradation loss of the energy storage device determined at 852 with the predicted degradation loss associated with the energy storage device determined at 854.

At 858, a computing device, such as meter computing system 106, determines a correlation of the digital unit to the predetermined increment of generated power based on the comparison at 856 of the predicted degradation loss associated with the energy storage device to the actual degradation loss over time within the energy storage device.

Figure 10:
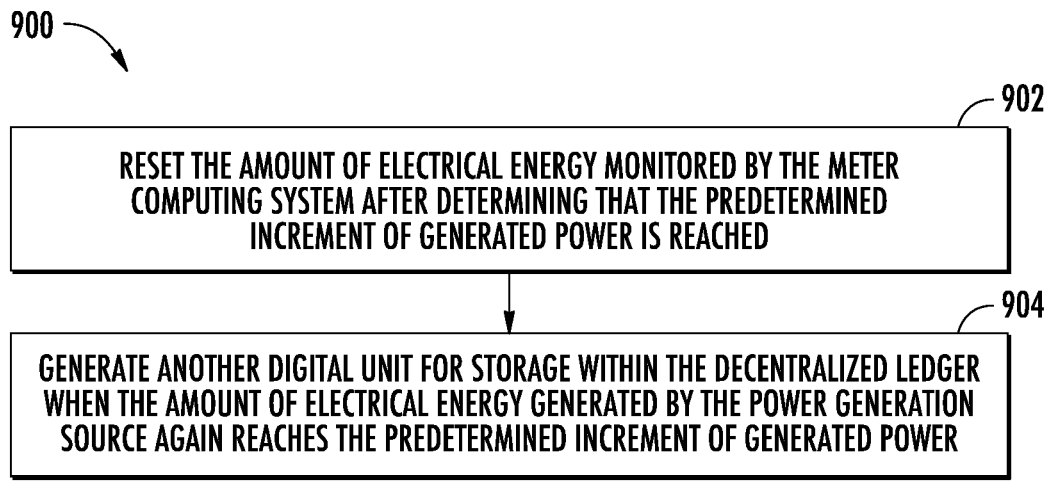
FIG. 10 depicts a flowchart diagram of an example method for continuously generating digital units according to example embodiments of the present disclosure.

FIG. 10 is a flowchart diagram depicting an example process 900 for continuously generating digital units according to example embodiments of the disclosed technology. For example, process 900 can be implemented as part of or in addition to the operations of process 700. Although FIG. 10 depicts steps/operations performed in a particular order for purposes of illustration and discussion, the methods of the present disclosure are not limited to the particularly illustrated order or arrangement. The various steps of process 900 can be omitted, rearranged, combined, and/or adapted in various ways without deviating from the scope of the present disclosure. In example embodiments, process 900 may be performed by a meter computing system such as meter computing system 106.

At 902, a computing system, such as meter computing system 106, resets the amount of electrical energy monitored by the meter computing system after determining that the predetermined increment of generated power is reached.

At 904, a computing system, such as meter computing system 106, generates another digital unit for storage within the decentralized ledger when the amount of electrical energy generated by the power generation source again reaches the predetermined increment of generated power.

Figure 11:
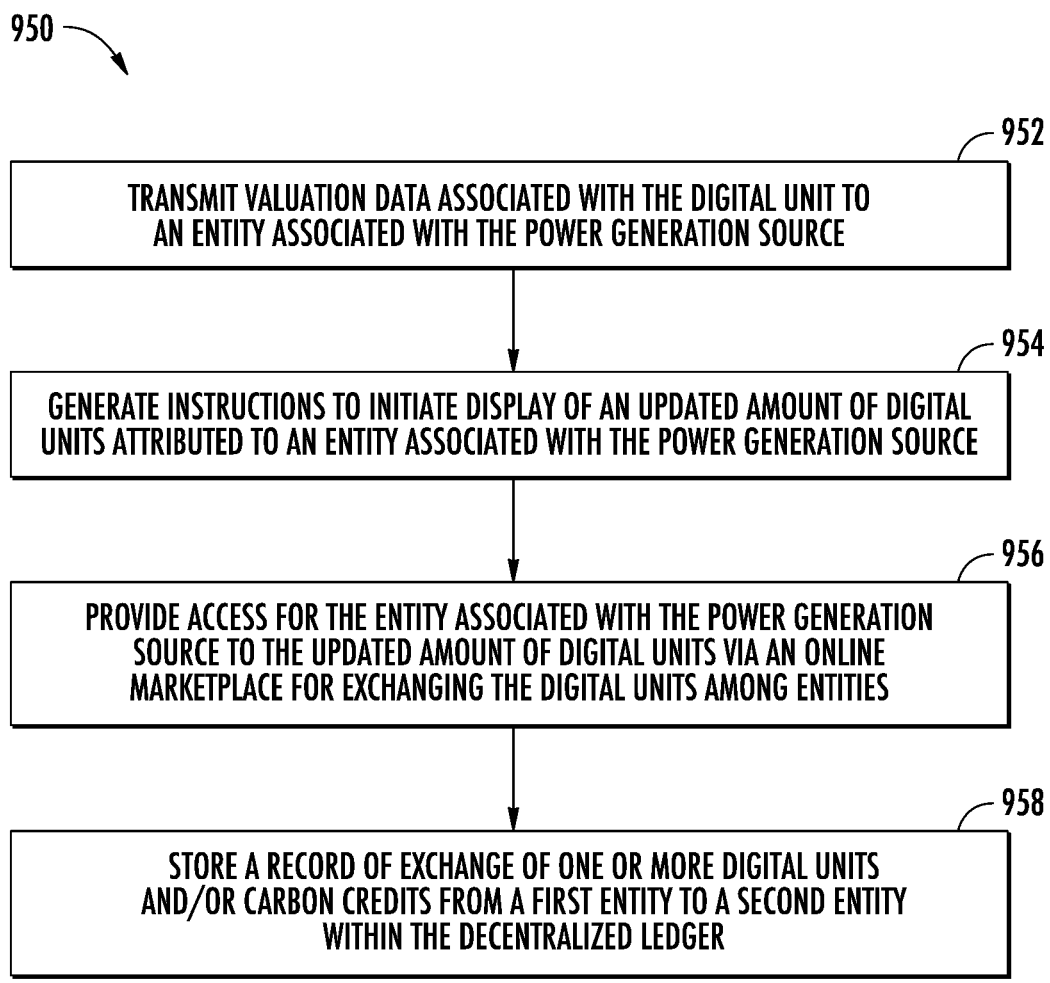
FIG. 11 depicts a flowchart diagram of an example method for implementing exchange-based transactions of digital units according to example embodiments of the present disclosure.

FIG. 11 is a flowchart diagram depicting an example process 950 for implementing exchange-based transactions of digital units according to example embodiments of the disclosed technology. For example, process 950 can be implemented as part of or in addition to the operations of process 700. Although FIG. 11 depicts steps/operations performed in a particular order for purposes of illustration and discussion, the methods of the present disclosure are not limited to the particularly illustrated order or arrangement. The various steps of process 950 can be omitted, rearranged, combined, and/or adapted in various ways without deviating from the scope of the present disclosure. In example embodiments, process 950 may be performed by a meter computing system such as meter computing system 106.

At 952, a computing system, such as meter computing system 106, transmits valuation data associated with the digital unit to an entity associated with the power generation source.

At 954, a computing system, such as meter computing system 106, generates instructions to initiate display of an updated amount of digital units attributed to an entity associated with the power generation source upon generation of the digital unit.

At 956, a computing system, such as meter computing system 106, provides access for the entity associated with the power generation source to the updated amount of digital units via an online marketplace for exchanging the digital units among entities.

At 958, a computing system, such as meter computing system 106, stores a record of exchange of one or more digital units and/or carbon credits from a first entity to a second entity within the decentralized ledger.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Computer-implemented tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method comprising:
receiving, by a meter computing system coupled to a power generation source, an authentication of the meter computing system as a node within a decentralized ledger accessible by a plurality of networked computing devices;
determining a type of the power generation source, wherein the type of the power generation source comprises a renewable power generation source;
determining a predetermined increment of generated power based on the type of the power generation source;
monitoring, by a sensor coupled to the meter computing system, an amount of electrical energy generated by the power generation source over time;
determining when the amount of electrical energy generated by the power generation source reaches the predetermined increment of generated power;
generating a digital unit in response to a current signal indicative of a current flowing from the power generation source through the sensor reaching the predetermined increment of generated power, wherein the digital unit comprises a unique hashed digital signature that includes unit traceability data for verification of energy production by the power generation source;
wherein the digital unit comprises a carbon credit based on the type of the power generation source, the predetermined increment of the generated power, and a carbon offset value indicative of an amount of carbon emissions reduction achieved by the renewable power generation source;
storing the digital unit within the decentralized ledger as a hashed representation of the digital unit based on the unique hashed digital signature associated with the meter computing device and corresponding power generation source;
storing at least a defined portion of the predetermined increment of generated power in an energy storage device coupled to the meter computing system; and
periodically monitoring the defined portion of the predetermined increment of generated power in the energy storage device coupled to the meter computing system to determine an actual degradation loss associated with the energy storage device.

2. The computer-implemented method of claim 1, wherein the renewable power generation source comprises one of a magnetic generator, a solar generator, a wind generator, or a hydroelectric generator.

3. The computer-implemented method of claim 1, further comprising:
initializing the decentralized ledger using a plurality of designated computing devices configured to serve as nodes, wherein the plurality of designated computing devices comprises the meter computing system.

4. The computer-implemented method of claim 1, wherein:
a correlation of the digital unit to the predetermined increment of generated power is determined based on a predicted degradation loss associated with the energy storage device; and
the correlation of the digital unit to the predetermined increment of generated power is updated based on a comparison of the predicted degradation loss associated with the energy storage device to the actual degradation loss over time within the energy storage device.

5. The computer-implemented method of claim 1, further comprising:
monitoring a consumption of the defined portion of the predetermined increment of the generated power stored in the energy storage device; and
storing data within the decentralized ledger indicative of the consumption of the defined portion of the predetermined increment of the generated power stored in the energy storage device.

6. The computer-implemented method of claim 5, wherein the data within the decentralized ledger indicative of the consumption of the defined portion of the predetermined increment of the generated power stored in the energy storage device comprises a deletion of the digital unit.

7. The computer-implemented method of claim 1, wherein the unit traceability data comprises at least one of a date when the amount of electrical energy was generated by the power generation source, a time when the amount of electrical energy was generated by the power generation source, a geographical location of the power generation source, or a unique identifier associated with the power generation source.

8. The computer-implemented method of claim 1, further comprising:
resetting the amount of electrical energy monitored by the meter computing system after determining that the predetermined increment of generated power is reached; and
generating another digital unit for storage within the decentralized ledger when the amount of electrical energy generated by the power generation source again reaches the predetermined increment of generated power.

9. The computer-implemented method of claim 1, further comprising:
transmitting valuation data associated with the digital unit to an entity associated with the power generation source.

10. The computer-implemented method of claim 1, further comprising:
generating instructions to initiate display of an updated amount of digital units attributed to an entity associated with the power generation source upon generation of the digital unit.

11. The computer-implemented method of claim 10, further comprising:
providing access for the entity associated with the power generation source to the updated amount of digital units via an online marketplace for exchanging the digital units among entities.

12. One or more non-transitory, computer-readable media storing instructions that are executable by one or more processors to cause the one or more processors to perform operations, the operations comprising:
receiving, by a meter computing system coupled to a power generation source, an authentication of the meter computing system as a node within a decentralized ledger accessible by a plurality of networked computing devices;
determining a type of the power generation source, wherein the type of the power generation source comprises a renewable power generation source;
determining a predetermined increment of generated power based on the type of the power generation source;

monitoring, by a sensor coupled to the meter computing system, an amount of electrical energy generated by the power generation source over time;

determining when the amount of electrical energy generated by the power generation source reaches the predetermined increment of generated power;

generating a digital unit in response to a current signal indicative of a current flowing from the power generation source through the sensor reaching the predetermined increment of generated power, wherein the digital unit comprises a unique hashed digital signature that includes unit traceability data for verification of energy production by the power generation source;

wherein the digital unit comprises a carbon credit based on the type of the power generation source, the predetermined increment of the generated power, and a carbon offset value indicative of an amount of carbon emissions reduction achieved by the renewable power generation source;

storing the digital unit within the decentralized ledger as a hashed representation of the digital unit based on the unique hashed digital signature associated with the meter computing device and corresponding power generation source;

storing at least a defined portion of the predetermined increment of generated power in an energy storage device coupled to the meter computing system;

resetting the amount of electrical energy monitored by the meter computing system after determining that the predetermined increment of generated power is reached; and generating another digital unit for storage within the decentralized ledger when the amount of electrical energy generated by the power generation source again reaches the predetermined increment of generated power.

13. The one or more non-transitory, computer-readable media of claim 12, wherein the renewable power generation source comprises one of a magnetic generator, a solar generator, a wind generator, or a hydroelectric generator.

14. The one or more non-transitory, computer-readable media of claim 12, wherein the operations further comprise:
initializing the decentralized ledger using a plurality of designated computing devices configured to serve as nodes, wherein the plurality of designated computing devices comprises the meter computing system.

15. A meter computing system coupled to a power generation source, the meter computing system comprising:
a sensor that monitors an amount of electrical energy generated by the power generation source over time;
one or more processors; and
one or more tangible, non-transitory, computer readable media that store instructions that are executable by the one or more processors to cause the meter computing system to perform operations, the operations comprising:

receiving an authentication of the meter computing system as a node within a decentralized ledger accessible by a plurality of networked computing devices;

determining a type of the power generation source, wherein the type of the power generation source comprises a renewable power generation source;

determining a predetermined increment of generated power based on the type of the power generation source;

determining when the amount of electrical energy generated by the power generation source reaches the predetermined increment of generated power;

generating a digital unit in response to a current signal indicative of a current flowing from the power generation source through the sensor reaching the predetermined increment of generated power, wherein the digital unit comprises a unique hashed digital signature that includes unit traceability data for verification of energy production by the power generation source;

wherein the digital unit comprises a carbon credit based on the type of the power generation source, the predetermined increment of the generated power, and a carbon offset value indicative of an amount of carbon emissions reduction achieved by the renewable power generation source;

storing the digital unit within a decentralized ledger accessible by the meter computing device, wherein the digital unit is stored as a hashed representation based on the unique hashed digital signature associated with the meter computing device and corresponding power generation source;

storing at least a defined portion of the predetermined increment of generated power in an energy storage device coupled to the meter computing system;

resetting the amount of electrical energy monitored by the meter computing system after determining that the predetermined increment of generated power is reached; and generating another digital unit for storage within the decentralized ledger when the amount of electrical energy generated by the power generation source again reaches the predetermined increment of generated power.

* * * * *